(12) United States Patent
Schwabe et al.

(10) Patent No.: US 12,319,847 B2
(45) Date of Patent: Jun. 3, 2025

(54) PROCESSING-OPTIMIZED, REACTIVE POLYMER COMPOSITION

(71) Applicant: Clariant International Ltd, Muttenz (CH)

(72) Inventors: Jeremia Schwabe, Augsburg (DE); Eric Hauck, Pirmasens (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 0 days.

(21) Appl. No.: 18/571,619

(22) PCT Filed: Jun. 13, 2022

(86) PCT No.: PCT/EP2022/066052
§ 371 (c)(1),
(2) Date: Dec. 18, 2023

(87) PCT Pub. No.: WO2023/274706
PCT Pub. Date: Jan. 5, 2023

(65) Prior Publication Data
US 2024/0263058 A1    Aug. 8, 2024

(30) Foreign Application Priority Data
Jul. 1, 2021 (EP) ..................... 21183067

(51) Int. Cl.
| | | |
|---|---|---|
| *C09J 151/06* | (2006.01) | |
| *C08F 210/06* | (2006.01) | |
| *C08F 255/02* | (2006.01) | |
| *C09J 5/06* | (2006.01) | |
| *C09J 123/12* | (2006.01) | |

(52) U.S. Cl.
CPC ........... *C09J 151/06* (2013.01); *C08F 210/06* (2013.01); *C08F 255/02* (2013.01); *C09J 5/06* (2013.01); *C09J 123/12* (2013.01); *C09J 2451/00* (2013.01)

(58) Field of Classification Search
None
See application file for complete search history.

(56) References Cited

U.S. PATENT DOCUMENTS

| | | | | |
|---|---|---|---|---|
| 4,956,423 A | * | 9/1990 | Lee | .......... C08L 79/08 |
| | | | | 525/434 |
| 2005/0043455 A1 | | 2/2005 | Hohner | |
| 2011/0060078 A1 | * | 3/2011 | Becker | .................. C08F 255/00 |
| | | | | 524/68 |

FOREIGN PATENT DOCUMENTS

| | | | | |
|---|---|---|---|---|
| DE | 10338344 A1 | | 3/2005 | |
| EP | 0827994 B1 | | 12/2002 | |
| EP | 3287276 A1 | | 2/2018 | |
| EP | 1896542 B1 | * | 6/2018 | ............. C08L 23/10 |
| EP | 3711947 A1 | | 9/2020 | |
| JP | 2012500292 | | 1/2012 | |
| JP | 2020521832 | | 7/2020 | |
| WO | 8911513 A1 | | 11/1989 | |
| WO | 2007008765 A2 | | 1/2007 | |
| WO | 2009133093 A1 | | 11/2009 | |
| WO | 2010018027 A1 | | 2/2010 | |

OTHER PUBLICATIONS

Viscosity—Purdue Chemistry (Year: 2003).*
International Search Report and Written Opinion issued in App. No. PCT/EP2022/066052, mailing date Sep. 1, 2022, 11 pages.

* cited by examiner

Primary Examiner — Michael N Orlando
Assistant Examiner — Abhishek A Patwardhan

(57) ABSTRACT

Disclosed herein is a silane-modified polypropylene copolymer having a silicon content of 1% to 5% by weight, an enthalpy of fusion of 20 J/g to 35 J/g, and a melt viscosity at 170° C. of 500 MPas to 4500 MPas, and a process for preparing the same. Further disclosed is a reactive hot-melt adhesive formulation that includes the silane-modified polypropylene copolymer and a process for the adhesive bonding of substrates.

19 Claims, No Drawings

PROCESSING-OPTIMIZED, REACTIVE POLYMER COMPOSITION

TECHNICAL FIELD OF THE INVENTION

The invention relates to a silane-modified polypropylene copolymer having a silicon content between 1% and 5% by weight, an enthalpy of fusion between 20 J/g and 35 J/g, and a melt viscosity at 170° C. of between 500 mPas and 4500 mPas. The invention further relates to processing-optimized reactive hotmelt adhesive formulations comprising said silane-modified polypropylene copolymer, and to the use of said hotmelt adhesive formulations for the adhesive bonding of various substrates. The invention also relates to a process for preparing these silane-modified polypropylene copolymers.

BACKGROUND OF THE INVENTION

Semicrystalline poly-alpha-olefins serve in many cases as adhesive raw materials for a wide range of applications. The field of use extends from the hygiene sector through laminations and packaging adhesives as far as construction bonding and uses in wood processing.

By grafting with a crosslinking-capable agent, for example an alkoxysilane, it is possible to alter the cohesion, adhesion, mechanical stability and heat resistance of unmodified poly-alpha-olefins, since the crosslinking of the polymer chains with one another alters the macromolecular properties and the grafted-on alkoxysilane also enables the covalent incorporation of reactive surface groups (for example: —OH) into an adhesive bond.

Free-radically induced grafting of semicrystalline poly-alpha-olefins with silane groups leads to chain degradation in the ungrafted polymer, frequently with achievement of only very low functionalization rates and formation of graft products with a highly waxy character (e.g. WO 89/11513), which do not appear to be suitable for stable adhesive bonds.

This is also true of the free-radically induced grafting reaction of a polypropylene or propylene-rich copolymer, in which chain scission reactions are likewise known to take place, which reduce the molar mass (and hence also the melt viscosity) of the polymer. Corresponding polymers having high functionalization rates therefore inevitably have very low molar masses/melt viscosities and are unsuitable for many fields of application.

Furthermore, the subsequent crosslinking of the degraded chains by the silane groups results in a change in mechanical properties, which in an extreme case can lead to stiff, high-strength materials having a low embrittlement temperature.

WO 2007/008765 (Dow) describes the use of low-viscosity, silane-grafted poly(ethylene-co-1-olefin) polymers as adhesive raw material. The polymers that are used for modification have an ethylene content of at least 50 mol % of ethylene and preferably a polydispersity of 1 to 3.5; the entire range is reported to be 1 to 5. They show a low melt viscosity of at least 2000 and at most 50 000 cP at 177° C. 1-Olefin comonomers mentioned include numerous higher 1-olefins such as 1-hexene and 1-octene, for example. The silane-grafted polymers have low failure temperatures in PAFT and SAFT analysis. The use of polyolefins having a high ethylene content inevitably means the presence of long ethylene blocks in the polymer. This in turn leads to poor wetting and bonding properties on many plastic surfaces, and so very many bonding problems cannot be solved optimally. Moreover, long polyethylene sequences have a tendency to peroxidic crosslinking, as a result of which gel formation is unavoidable. The ungrafted base polymers have a relatively low molar mass and melt viscosity of not more than 50 000 cP at 177° C.

Likewise described is the use of crystalline and semicrystalline poly(propylene-co-1-olefin) polymers that are likewise said to be suitable for grafting. These have a propylene content of at least 50 mol % and preferably a melt viscosity of not more than 50 000 cP at 170° C. (before grafting and after grafting) and a polydispersity of 1 to 3.5. Crystallinity is reported to be 2-60% (i.e. 3-100 J/g). However, there are no examples of these polypropylene-based copolymers that are specified as preferred. Nor have any other studies been undertaken on polymers having an enthalpy of fusion between 20 and 35 J/g and a viscosity between 500 and 4500 mPas. Thus, WO 2007/008765 does not discuss specific combinations of features or the advantageous processing and bonding properties that result therefrom.

EP0827994 (Huels) describes the use of silane-grafted, amorphous poly(alpha-olefins) as moisture-crosslinking adhesive raw materials or adhesives. Base polymers used are atactic polypropylene (aPP), atactic poly(1-butene) or preferably co- or terpolymers of C4-C10 alpha-olefins (0-95% by weight), propene (5-100% by weight) and ethylene (0-20% by weight). The silane-modified APAO terpolymer described in the examples has a softening point of 98° C., a weight-average molecular weight of 38 000 g/mol and a melt viscosity of 6000 mPas. The grafting led to a decrease in the PDI by more than 35%, and the decrease in viscosity is 88%. There is no detailed discussion of processing properties in conjunction with the mechanical properties.

DE10338344A1 (Clariant) relates to semicrystalline poly-olefin homo- or copolymers that have been free-radically modified with a silane compound and have a viscosity, measured at 170° C., between 10 and 50 000 mPas and a heat of fusion of greater than 10 J/g. The examples disclose polyolefins having melt viscosities at 170° C. of below 1000 mPas, drip points above 110° C. and heats of fusion of at least 60 J/g. They are suitable as a constituent of hotmelt adhesive formulations. There is no disclosure of the combination of low melt viscosities with heats of fusion of between 20 and 35 J/g. The silane-modified crystalline polyolefin waxes are produced by metallocene catalysis and have a high propylene content.

In the case of hotmelt adhesive formulations comprising silane-modified polyolefins, the bonding process has two stages. In order to avoid processing problems and to be able to assure simple application, the person skilled in the art is looking for hotmelt adhesive formulations having a low viscosity in order to be able to apply the hotmelt adhesive at relatively low temperatures with pressure. As soon as the adhesive has been applied, the crosslinking is initiated, which increases the viscosity and builds up the cohesion of the bond, which is supposed to ensure mechanical stability for the final bond.

However, it should be taken into account here that very low-viscosity products with viscosities below 8000 mPas usually have shortcomings in mechanical properties such as modulus of elasticity, strength and elongation at break, since the very short chain lengths have the result that there are fewer polymer entanglements and the products are more likely to have waxy properties. Furthermore, the very short chain lengths result in rapid embrittlement of the material on crosslinking, since the short, mutually crosslinked polymer chains have only low flexibility. Thus, the prior art teaches away from the use of very low-viscosity base polymers and recommends the use of relatively large amounts of tackifiers in conjunction with silanized polyolefins of relatively high viscosity.

The adhesive tackifier affects the viscosity of the adhesive bond and the initial adhesion, and is frequently a resin. These resins are, for example, low molecular weight products from the C5 or C9 stream from petroleum processing, often contain aromatics and usually have a glass transition temperature above room temperature.

Thus, the addition of resins to hotmelt adhesive formulations increases the glass transition temperatures of the formulations, and so such hotmelt adhesives suffer from reduced low-temperature flexibility and the temperature range in which the hotmelt adhesive can be used is limited.

WO2010018027A1 (Evonik) describes silane-modified polypropylene co- and terpolymers having a high degree of functionalization and having a content of poly(ethylene) triads of not more than 2.5% by weight, enthalpies of fusion of 9-20 J/g and a xylene solubility of greater than 96% by weight; the best results were achieved with terpolymers comprising ethylene and 1-butene. Many example formulations are mentioned for various adhesive bonds that contain these modified polyolefins. These formulations do give relatively good mechanical stability after bonding, but relatively large amounts of tackifier are required in order to assure good processing properties and sufficient initial tack. The lowest proportion of the modified polyolefins in a formulation is reported as 24.7% by weight in an example formulation for edge gluing. All other examples contain 30% by weight or more.

Moreover, WO2010018027A1 teaches that a peroxidically induced grafting reaction further reduces the polydispersity of the polymers used, and concludes from this that the modified polymers have a polydispersity of much less than 3.5, which allegedly leads to various drawbacks in terms of processing properties in particular. Furthermore, the document teaches that the use of base polymers of relatively low molecular weight generally leads to comparatively low functionalization rates.

EP3287276A1 (Sika) describes hotmelt adhesive compositions comprising a silane-modified poly-alpha-olefin which is solid at 25° C., an unmodified amorphous C3/C2 copolymer wax having a softening temperature of <120° C. and a paraffin wax having a softening point of 80-130° C. The adhesive compositions contain various silane-modified poly-alpha-olefins, the sum total of which in the formulation is >55% by weight.

WO2009133093 (Sika) describes hotmelt adhesive compositions having a prolonged open time, comprising a silane-modified poly-alpha-olefin which is solid at 25° C. and a plasticizing resin having a melting or softening point of 10-40° C. The examples of the formulations contain 65% by weight of silane-modified poly-alpha-olefin. The proportion of all silane-grafted poly-alpha-olefins is more than 50% by weight, preferably between 60% and 90% by weight.

It is thus found that it is typically necessary to add tackifiers and low-viscosity components in relatively large amounts to silane-modified adhesive formulations in order to establish a viscosity appropriate for processing and the initial strength of the bond. Without this addition, silanized polyolefins have a high viscosity that restricts the spectrum of use and presents the adhesive formulator with additional process-related and material-specific problems. Therefore, the adhesive formulator is constantly looking for solutions that are suitable for a balanced, broad spectrum of use, need a minimum number of individual components and minimize the proportion of functional additives.

There was thus a need for functionalized polyolefins as and for hotmelt adhesives which, by virtue of their improved material properties even at low temperatures (below 170° C.), can be processed and applied easily without having to use much resin or tackifier, and which nevertheless enable sufficient initial adhesion and a flexible and stable bond, and high heat resistance of the hotmelt adhesive.

Subject Matter of the Invention

It has been found that, surprisingly, a silane-modified polypropylene copolymer having a silicon content between 1% and 5% by weight, based on the total amount of the modified polymer, a melt viscosity at 170° C. of greater than 500 mPas and less than 4500 mPas, and an enthalpy of fusion of greater than 20 J/g and less than 35 J/g, preferably greater than 20 J/g and less than 30 J/g, as hotmelt adhesive or as a constituent of a hotmelt adhesive formulation, imparts extremely advantageous properties to the formulation as such, which are reflected in improved processability thereof inter alia. Copolymers in the context of the invention refer to polymers composed of two or more different monomer units. The silane-modified polypropylene copolymer comprises, as a further monomer, one or more monomers selected from the group consisting of ethylene and 1-butene, preference being given to a binary copolymer and particular preference to ethylene as comonomer alongside propylene.

The silane-modified polypropylene copolymer leads both to very good processability and to very good mechanical properties of the bond, which can be described qualitatively and quantitatively in terms of good cohesion, adhesion, heat resistance and elongation at break of the hotmelt adhesive. A relatively low proportion of the reactive silanized component in the formulation is required in order to achieve the same profile of demands of the hotmelt adhesive in terms of heat resistance, cohesion, elongation at break etc. than would be the case in conventional formulations. The advantageous properties of the hotmelt adhesive are especially manifested on polar substrates.

DETAILED DESCRIPTION OF THE INVENTION

The unmodified polypropylene copolymer is modified by grafting. Side reactions that can occur in the course of grafting lead to chain scission of the grafted polymer inter alia, and so grafting and modification should be considered to be synonymous in the present application.

As well as the described silicon content of between 1% and 5% by weight, the melt viscosity at 170° C. of greater than 500 mPas and less than 4500 mPas, and the enthalpy of fusion of greater than 20 J/g and less than 35 J/g, preferably greater than 20 J/g and less than 30 J/g, the silane-modified polypropylene copolymer preferably has a melt viscosity of between 10% and 50% of the original viscosity of the unmodified polypropylene. A corresponding percentage change in the melt viscosity enables particularly easy processability in combination with good mechanical stability by virtue of the correct degree of crosslinking.

The silane to be grafted on preferably has olefinic double bonds and one to three alkoxy groups bonded directly to the silicon atom. In particular, the one or more silanes are selected from the group comprising vinyltrimethoxysilane (VTMO), vinyltriethoxysilane, vinyltris(2-methoxyethoxy)silane, 3-methacryloyloxy-propyltrimethoxysilane (MEMO; $H_2C=C(CH_3)COO(CH_2)_3-Si(OCH_3)_3$), 3-methacryloyloxypropyltriethoxysilane, vinyldimethylmethoxysilane and/or vinylmethyldibutoxysilane. The silane is most preferably vinyltrimethoxysilane.

In order to establish the desired mechanical properties, it is advantageous when the polypropylene copolymer backbone of the silane-modified polypropylene copolymer has a weight-average molecular weight, measured to ISO 16014-1, of greater than 10 000 and less than 30 000 g/mol, preferably greater than 10 000 and less than 20 000 g/mol, since, within this molecular weight range, the polymer chains have been sufficiently functionalized and can accordingly be stably crosslinked, but they still have sufficient flexibility.

The silane-modified polypropylene copolymer preferably has a polydispersity index (PDI) of less than 2.5. This has preferably increased as a result of the grafting, and the increase with respect to the ungrafted polymer is at least 20%. This change in the PDI as a result of the grafting is apparently established only in the case of silane-modified polypropylene-based copolymers where free-radically induced chain degradation occurs to a degree which leads to sufficient lowering of viscosity, but which is nevertheless small enough to permit later crosslinking to an extent that assures both high flexibility and sufficient strength of the bond. This increase in the PDI was completely surprising since free-radically induced chain degradation usually leads to a reduction in the PDI.

The silane-modified polypropylene copolymer preferably has a softening point between 85 and 95° C. Silane-modified polypropylene copolymers having their softening point within this range have sufficiently good properties both for heat resistance and for processability.

In addition, the silane-modified polypropylene copolymer preferably has a density of greater than 0.900 g/cm$^3$.

The silane-modified polypropylene copolymer preferably has an mm triad of the propylene fraction in the region of not more than 90 mol % and an rr triad of at least 5 mol %. A silane-modified polypropylene copolymer having said microstructure shows the desired processing properties and mechanical properties.

In a preferred embodiment, the silane-modified polypropylene copolymer has been produced with the aid of a metallocene catalyst.

In a preferred embodiment, the unmodified reactant of the silane-modified polypropylene copolymer has a propylene content of at least 60 mol % of propylene, more preferably between 70 and 90 mol % of propylene. Within this range, the comonomer content is large enough to prevent embrittlement of the material, but also not yet so high that the bonding properties would decrease because of an excessively high ethylene content.

More preferably, the unmodified reactant of the silane-modified polypropylene copolymer has a propylene content that has been ascertained with the aid of $^{13}$C NMR of at least 60 mol % of propylene.

In addition, the invention further provides a process for preparing a silane-modified polypropylene copolymer as claimed in claim 1, comprising the steps of
  a) providing a polypropylene copolymer,
  b) adding the graft component and the free-radical initiator,
  c) evaporating the excess monomer,
characterized in that the grafting reaction results in a decrease in the melt viscosity of 50-90% and an increase in the PDI by at least 20% of the grafting product by comparison with the starting material.

Preference is given to using, in the process of the invention, an unmodified polypropylene copolymer having a melt viscosity, measured to DIN 53019 at 170° C., of between 500 and 7000 mPas, preferably between 700 and 5000 mPas, more preferably between 800 and 4000 mPas, and an enthalpy of fusion, measured to ISO 11357-3, of between 30 J/g and 55 J/g, preferably between 30 and 50 J/g, more preferably between 30 and 45 J/g.

The invention further provides a hotmelt adhesive formulation comprising a silane-modified polypropylene copolymer of the invention and one or more base polymers selected from the group consisting of unmodified polyolefins and unmodified thermoplastic styrene block copolymers (TPE-S), wherein the silane-modified polypropylene copolymer and the base polymer form at least 50% by weight of the hotmelt adhesive formulation and the silane-modified polypropylene copolymer is used to an extent of not more than 30% by weight, based on the total weight of the hotmelt adhesive formulation.

The unmodified polyolefins are preferably crystalline or semicrystalline polyolefins or amorphous polyolefins (APAO), ethylene-vinyl acetate copolymers (EVA) and polyisobutylene (PIB), where the polyolefins are more preferably formed from C3/C2 copolymers and the unmodified styrene block copolymers are preferably SBS, SEBS, SEPS, SEEPS and MBS.

The hotmelt adhesive formulation preferably has a melt viscosity at 170° C., measured to DIN 53019, of less than 5000 mPas and a tensile strength of at least 4 MPa, since a hotmelt adhesive with these properties constitutes an optimum between processability and mechanical stability.

The hotmelt adhesive formulation of the invention may contain synthetic and/or natural resins, especially tackifying resins, synthetic and/or natural oils, inorganic and/or organic, synthetic and/or natural polymers, which may electively be electrically conductive or insulating.

In particular, the hotmelt adhesive formulation of the invention comprises tackifying resins (tackifiers), where the resins are used in order to adjust particular properties of the adhesive layer, especially tackiness and/or adhesion, the flow and creep characteristics of the adhesive layer and/or the adhesive viscosity, to particular demands. These may be natural resins and/or synthetic resins. In the case of natural resins, these natural resins contain abietic acid as a main constituent (e.g. rosin). In addition, the resins may be terpene or polyterpene resins, petroleum resins and/or coumarone-indene resins, especially what are called C5 resins and/or C9 resins and/or copolymers of C5/C9 resins.

The proportion of tackifiers in the hotmelt adhesive of the invention is not more than 35% by weight of tackifier, more preferably between 1% and 30% by weight and especially preferably between 3% and 20% by weight, based on the overall formulation, since the viscosity of the hotmelt adhesive which is preferred for processing can also be achieved with small amounts of resin, and these amounts in the hotmelt adhesive of the invention are sufficient to assure a sufficient initial adhesion.

The hotmelt adhesive of the invention may contain further constituents that are needed to achieve specific properties, for example deformability, adhesion, processability, crosslinking rate, crosslinking density, (melt or solution) viscosity, strength, crystallization rate, tack, storage stability etc.

The hotmelt adhesive formulation more preferably contains, based on its total mass, 40-80% by weight of the base polymer, 10-30% by weight of the polypropylene copolymer and 10-30% by weight of tackifier. In the case of a formulation with these weight ratios, the preferred properties are manifested optimally, and a hotmelt adhesive having a particularly balanced profile of properties is provided.

The proportion of the further constituents, in a particular embodiment of the present invention, is especially preferably not more than 10% by weight. This has the advantage that the material properties of the adhesive formulation are essentially those of the polymer of the invention used. Such an adhesive formulation can be produced with a very low level of complexity.

The further constituents may be crosslinking accelerators, especially silanol condensation catalysts, inorganic and/or organic fillers that may be electively electrically conductive or insulating, inorganic and/or organic pigments that may be electively electrically conductive or insulating, inorganic and/or organic, synthetic and/or natural fibers that may be electively electrically conductive or insulating, inorganic and/or organic stabilizers and/or inorganic and/or organic flame retardants.

In an alternative embodiment, the silane-modified polypropylene copolymer or the hotmelt adhesive formulation comprises a crosslinking accelerator which is present in an amount of 0.1-1% by weight, based on the total amount of the mixture of silane-modified polypropylene copolymer and crosslinking accelerator or of the hotmelt adhesive formulation.

This is preferred particularly when the polymers of the invention are used in an adhesive bond that is to achieve its maximum durability within a short time after joining.

Suitable crosslinking accelerators are a multitude of chemical compounds, especially Brønsted acids and/or Lewis acids, for example acetic acid, itaconic acid, zinc(II) acetate, cadmium acetate, zinc oxide, zinc stearate, zinc(II) chloride, tin(IV) chloride, dibutyltin oxide, dibutyltin dilaurate, bismuth citrate, bismuth(III) oxide, bismuth titanate, tetrabutylgermanium, tetrabutyltin, titanium boride, titanium(IV) oxide, titanium acetylacetonate, tributyl titanate, sodium chloride, magnesium(II) chloride, zinc acetylacetonate, zinc methacrylate, zinc niobate, tin(II) oxide, tin(IV) oxide, zirconium(IV) acetylacetonate, zirconium(IV) oxide and/or zirconium(IV) silicate.

Test Methods:

The polyolefins listed were characterized according to the listed standards. Non-standard characterizations were carried out as per the description.

The determination of the weight-average and number-average molecular weights $M_w$ and $M_n$ of the copolymers was conducted in 1,3-ortho-dichlorobenzene and determined by PP calibration. The measurement was effected by gel permeation chromatography at a temperature of 135° C. The determination was effected in accordance with ISO 16014-1.

Softening points were determined according to ASTM D 3104.

Density was determined in accordance with ISO 1183-3: 1999.

Melt viscosity is determined according to DIN 53019 as follows:

The liquid to be examined is in an annular gap between two coaxial cylinders, one of which rotates at constant speed (rotor), with the other at rest (stator). What is determined is the speed and torque needed to overcome the frictional resistance of the liquid in the annular gap.

The geometric dimensions of the system and the torque and speed values ascertained can be used to calculate the shear stress that exists in the liquid and the speed gradient.

The standard describes, by stipulating particular geometric ratios, a standard flow diagram for measurement of the flow characteristics of newtonian and non-newtonian liquids in rotary viscometers with coaxial cylinders. Since the reactants and the silane-modified products are structurally viscous liquids, the dynamic viscosity from three measurements each at 170° C. at different shear rates was averaged (shear rate 1: 192 1/s, shear rate 2: 318 1/s, shear rate 3: 532 1/s).

Enthalpy of fusion and glass transition temperature were determined by differential calorimetry (DSC) to ISO 11357-3 and to ISO 11357-2.

Enthalpy of fusion, glass transition temperature and the melting range of the crystalline component are determined via DSC from the 2nd heating curve at a heating rate of 10 K/min. The turning point in the heat flow curve is evaluated as the glass transition temperature. In the present case, the modified polymers are always analyzed without further additions in the uncrosslinked state; it is advisable for there to be blanketing with dry protective gas or inert gas (e.g. nitrogen, argon etc.) during the measurement.

The polydispersity index PDI is calculated from the quotient of weight-average molecular weight $M_w$ and number-average molecular weight $M_n$ and was determined according to standard ISO 16014-1.

The silicon content was ascertained by adsorption photometry using a Perkin-Elmer Lambda 35 photometer.

For this purpose, the sample to be analyzed is digested as follows: Depending on the Si content, 0.1-0.15 g of the polymer is weighed into a platinum crucible, and 0.5 ml of concentrated sulfuric acid is added. The liquid is evaporated off on a hot plate and then converted to ash in a muffle furnace at 600° C. for 1.5 to 2 h, which results in formation of sulfate ash. Subsequently, the sulfate ash is digested with a minimum amount of sodium carbonate in a flame, leached out of the platinum crucible with Millipore water and rinsed over into a 100 ml plastic standard flask.

In order to photometrically determine the silicon content of the sample thus digested, 10 ml of the digested solution is pipetted into a 50 ml plastic standard flask and 5 ml of 2 M sulfuric acid is added in order to adjust the pH. Then 10 ml of molybdate reagent is added and the solution is made up to 50 ml with Millipore water.

Before the measurement, the photometer is calibrated by the following method: A calibration series with concentrations of 0, 1, 2, 4, 5 mg Si/l is pipetted from the stock solution into a 50 ml flask. In order to adjust the pH, 5 ml of 2 M sulfuric acid is added. Thereafter, 10 ml of molybdate reagent is added, and the calibration solutions are transferred to corresponding cuvettes. After 2 to 10 minutes in the photometer, at a wavelength of 400 nm, calibration is effected with the samples of the calibration series. In order to verify the calibration, an external control standard with the concentration of 5 mg Si/l is prepared analogously and measured in the photometer.

The solution of the sample of which the silicon content has to be determined is transferred to a cuvette and, after 2 to 10 minutes in the photometer, measured at a wavelength of 400 nm.

Adhesion was determined as bond shear strength in the lap shear test according to DIN EN 1465.

All the specimens used are cleaned and dedusted prior to the preparation of the sample. All the plastic specimens and glass specimens are additionally degreased with a suitable cleaning agent prior to the preparation of the sample. This is followed by the bonding of the test specimens in accordance with DIN EN 1465. All the specimens thus produced are stored before use in a climate-controlled cabinet at 200C and 50% rel. humidity for 14 days. This achieves a uniform water content, for example in the case of wood specimens. In this way, singular effects caused by an elevated moisture content, for example in the case of hydrophilic or hydrolysis-sensitive polymers, are ruled out or minimized.

Cohesion was determined as tensile strength in the tensile test according to DIN EN ISO 527-3.

The propylene content and the PP triads were determined by means of $^{13}C$ NMR, with performance of quantification by means of integration of the characteristic signal:

The $^{13}C$ NMR spectra were recorded using a Varian Mercury-VX 400 (9.4 tesla) NMR spectrometer by means of a 5 mm sample head (nuc4, 13C-sensitive). The $^{13}C$ NMR measurements (Larmor frequency: 100.62 MHz) were effected under quantitative conditions, i.e. using the inverse-gated pulse sequence. Further parameters were as follows: spectral width: 25 kHz; recording time: 1.3 s; relaxation delay: 20 s; number of scans: about 4000; excitation angle: 90°; measurement temperature: 80° C.

For this purpose, about 50 mg of the EP copolymer in each case was dissolved and homogenized in 0.7 ml of solvent (20% C6D6/80% 1,2,4-trichlorobenzene).

The proportions of the triads were calculated in accordance with a Markov statistical probability analysis fitted to a PP/PE copolymer.

The elongation at break of the hotmelt adhesives of the invention was determined to ISO 527, except that a non-standard specimen that was produced by melt pressing and differs from the standard specimen by its dimensions was used in each case. The specimens used for measurement of strength and elongation at break have the following dimensions: total length: 50 mm, width of narrow part: 3.3 mm, width at ends: 7 mm, length of narrow parallel part: 25 mm, thickness: 1 mm.

Elongation at break corresponds to tensile strength at break and is determined to ISO 527 by a tensile test. What is determined here is the force per unit area (reported in MPa) required to break the specimen. With the exception of the specimen, the tensile test was effected according to standard ISO 527.

The invention is elucidated in detail by the examples that follow and the claims.

Design of the Examples:

For the grafting of the polypropylene copolymers produced with metallocene catalysts that are listed in columns 2 and 3 from table 1, 500 g of the respective polypropylene copolymer was melted in each case in a glass apparatus equipped with stirrer system, internal thermometer and distillation system under nitrogen blanketing. In columns 4 to 6 are the available data for the ungrafted comparative polyolefins from the prior art.

TABLE 1

| | Base polyolefin | | | | |
|---|---|---|---|---|---|
| | Licocene PP 2602 | Licocene PP 1302 | Vestoplast 708 | WO2010/ 018027 Ex. 6 | EP0827994 Ex. 1 |
| Softening point [° C.] | about 90 | about 82 | about 106 ± 4 (from TDS) | 102 | about 107 |
| Glass transition temperature (Tg) [° C.] | −29 | −32 | −33 | −39 | |
| Enthalpy of fusion (DSC) [J/g] | 38 | 35 | | 18.7 | |
| Weight-average molecular weight [g/mol] | 30 000 | 8800 | 75 000 | | 92 000 |
| Polydispersity index (PDI) [ ] | 1.7 | 1.7 | | | 4.1 |
| Density [g/cm³] | 0.900 | 0.900 | 0.87 | | |
| Melt viscosity at 170° C. [mPas] | 6300 | 200 | 8000 ± 2000 (@190° C.) | 68 000 (@190° C.) | 50 000 (@190° C.) |
| Propylene content [% by wt.] | >75 | >75 | | 84 | |
| Ethylene triad content [% by wt.] | >2.5 | >2.5 | | 2.4 | |

At a temperature of 160° C., over the course of 3 h, 50 g of trimethoxyvinylsilane (10% based on the amount of polymer used) was metered in continuously from a metering funnel, while 10 g of di-tert-butyl peroxide was added continuously from a second dropping funnel. After the end of metered addition, a further 1.1 g of di-tert-butyl peroxide was added to the reaction mixture and the mixture was left to react at 1600C for 1 h.

Subsequently, reduced pressure (about 30 mbar) was applied, and the volatile components were distilled off. After about 30 min, the mixture was decompressed to standard pressure by introducing nitrogen.

The properties of the resulting modification products are reported in table 2 in columns 2 and 3. In columns 4 to 6 are the available data for the grafted polyolefins from the prior art.

TABLE 2

| | Silane-modified polypropylene copolymer | | | | |
|---|---|---|---|---|---|
| | PP SI 1462 (inv.) | PP SI 1362 (cf. DE10338344) | Vestoplast 206 | WO2010/ 018027 Ex. 14 | EP0827994 Ex. 1 |
| Softening point [° C.] | about 90 | about 82 | about 98 ± 4 (from TDS) | | 98 |
| Glass transition temperature Tg [° C.] | −29 | −32 | −28 (from TDS) | | |
| Enthalpy of fusion [J/g] | 29 | 21 | 20 | | |
| Weight-average molecular weight [g/mol] | 12 300 | 8800 | 38 000 (from TDS) | | 38 000 |
| Polydispersity index (PDI) [ ] | 2.3 | 2.0 | 2.6 | | 2.6 |
| Si content [% by wt.] | 1.4-1.8 | 1.4-1.8 | 0.5 | 0.43 (XRF spectroscopy) | 6% VTMO used |
| Density: [g/cm³] | 0.900 | 0.900 | 0.87 | | |
| Melt viscosity (at 170° C.) [mPas] | 1000 | 110 | 5000 ± 1000 (from TDS) | 2000 (at 190° C.) | 6000 (at 190° C.) |
| Propylene content [% by wt.] | >75 | >75 | | 84 | |
| Ethylene triad content [% by wt.] | >2.5 | >2.5 | | 2.4 | |

Production of Hotmelt Adhesive Formulations and Bonding of Various Substrates

The hotmelt adhesive formulations of the invention were produced by producing molten mixtures of the silane-modified polypropylene copolymer and of the further components specified in table 3 in the proportions by weight specified therein by hotmelt mixing (about 180° C.) with a propeller stirrer.

In the above hotmelt adhesive formulations, in inventive examples 2, 5 and 8, it can be seen that, in the case of low viscosity of the formulation, it is possible to achieve elevated cohesion (tensile strength), elongation at break, heat resistances and also adhesion (lap shear strength) on various substrates, especially on wood. When the silane-modified polypropylene copolymer is used as the sole constituent of a hotmelt adhesive, the silane-modified compo-

TABLE 3

| Hotmelt adhesive formulation | Ex. 1 (comp.) | Ex. 2 (inv.) | Ex. 3 (comp.) | Ex. 4 (comp.) | Ex. 5 (inv.) | Ex. 6 (comp.) | Ex. 7 (comp.) | Ex. 8 (inv.) | Ex. 9 (comp.) |
|---|---|---|---|---|---|---|---|---|---|
| PP 2602 [% by wt.] | | | | 74.5 | 74.5 | 74.5 | 54.5 | 54.5 | 54.5 |
| SI 1362 [% by wt.] | 99.5 | | | 25.0 | | | 25.0 | | |
| SI 1462 [% by wt.] | | 99.5 | | | 25.0 | | | 25.0 | |
| Vestoplast 206 [% by wt.] | | | 99.5 | | | 25.0 | | | 25.0 |
| SU 400 [% by wt.] | | | | | | | 20.0 | 20.0 | 20.0 |
| Hordaphos MDAH [% by wt.] | 0.5 | 0.5 | 0.5 | 0.5 | 0.5 | 0.5 | 0.5 | 0.5 | 0.5 |
| Total [% by wt.] | 100 | 100 | 100 | 100 | 100 | 100 | 100 | 100 | 100 |
| Visc. @170° C. [mPas] | 200 | 1000 | 12,000 | 2400 | 4300 | 8000 | 1590 | 2800 | 5300 |
| Tensile strength [MPa] | 2.4 | 5.8 | 3.6 | 6.0 | 7.0 | 4.5 | 4.0 | 5.1 | 3.6 |
| Elongation at break [%] | 13 | 34 | 442 | 128 | 206 | 143 | 149 | 206 | 530 |
| Heat resistance [° C.] | 200 | 200 | 200 | 90 | 160 | 80 | 80 | 200 | 90 |
| Lap shear strength [MPa] | | | | | | | | | |
| PP | 1.0 | 1.3 | 2.9 | 1.7 | 1.7 | 2.9 | 3.8 | 3.4 | 3.4 |
| ABS | 0.7 | 0.8 | 1.6 | 0.4 | 0.7 | 0.5 | 2.9 | 3.0 | 2.7 |
| Wood | 4.1 | 7.1 | 4.0 | 3.6 | 5.1 | 1.1 | 5.0 | 5.9 | 3.3 |
| Glass | | | | 3.6 | 0.7 | n.d. | | 3.8 | 0.3 | nent of the invention is distinctly superior to the comparative examples on wood. On polypropylene (PP) and ABS as well, the component of the invention in pure form shows good adhesion, and is distinctly improved compared to comparative examples 1 and 3 in terms of cohesion.

These properties that are already favorable in pure form display their full potential in the formulation. Inventive examples 5 and 8, with the same concentration of the reactive component in the formulation, show a much lower viscosity, which distinctly improves and extends the user's processing spectrum, and additionally show a very much higher heat resistance and a distinct improvement in cohesion, adhesion and elongation at break compared to comparative examples 4, 6, 7 and 9.

The invention claimed is:

1. A silane-modified polypropylene copolymer containing as comonomers ethylene, 1-butene, or combinations thereof, wherein the silane-modified polypropylene copolymer
has a silicon content of between 1% and 5% by weight based on the total mass of the silane-modified polypropylene copolymer, as ascertained photometrically;
has a melt viscosity of greater than 500 mPas and less than 4500 mPa.s, as measured according to DIN 53019 at 170° C.;
has an enthalpy of fusion of greater than 20 J/g and less than 35 J/g, as measured according to ISO 11357-3; and
is prepared from an unmodified polypropylene copolymer with an enthalpy of fusion of between 30 J/g and 55 J/g.

2. The silane-modified polypropylene copolymer according to claim 1, wherein the melt viscosity of the silane-modified polypropylene copolymer is between 10% and 50% of the original viscosity of an unmodified polypropylene copolymer, as measured according to DIN 53019.

3. The silane-modified polypropylene copolymer according to claim 1, wherein the backbone of the polypropylene copolymer has a weight-average molecular weight of greater than 10 000 g/mol and less than 30 000 g/mol, as measured according to ISO 16014-1.

4. The silane-modified polypropylene copolymer according to claim 1, wherein the silane-modified polypropylene copolymer has a polydispersity index (PDI), as determined according to standard ISO 16014-1, that is less than 2.5 and that is at least 20% greater than the original PDI of an unmodified polypropylene copolymer.

5. The silane-modified polypropylene copolymer according to claim 1, wherein the silane-modified polypropylene copolymer has a softening point of between 85° C. and 95° C., as measured according to ASTM D 3104.

6. The silane-modified polypropylene copolymer according to claim 1, wherein the silane-modified polypropylene copolymer has a density of greater than 0.900 g/cm³, as measured according to ISO 1183-3:1999.

7. The silane-modified polypropylene copolymer according to claim 1, wherein the propylene fraction of the silane-modified polypropylene copolymer has an mm triad that is not more than 90 mol % and an rr triad that is at least 5 mol %, as ascertained with the aid of $^{13}$C NMR.

8. The silane-modified polypropylene copolymer according to claim 1, wherein the silane-modified polypropylene copolymer is prepared from an unmodified polypropylene copolymer with a propylene content of at least 60 mol %, as ascertained with the aid of $^{13}$C NMR.

9. A process for preparing the silane-modified polypropylene copolymer according to claim 1, the process comprising the steps of a) providing an unmodified polypropylene copolymer,
b) adding the silane graft component and the free-radical initiator, and
c) evaporating the excess monomer,
wherein the melt viscosity of the silane-modified polypropylene copolymer is 50% to 90% lower than the original melt viscosity of the unmodified polypropylene copolymer, as measured according to DIN 53019 at 170° C., and the PDI of the silane-modified polypropylene copolymer is at least 20% greater than the original PDI of the unmodified polypropylene copolymer, as determined according to standard ISO 16014-1.

10. The process according to claim 9, wherein the unmodified polypropylene copolymer has a melt viscosity of between 500 and 7000 mPas, as measured according to DIN 53019 at 170° C., and an enthalpy of fusion of between 30 J/g and 55 J/g, as measured according to ISO 11357-3.

11. A hotmelt adhesive formulation comprising the silane-modified polypropylene copolymer according to claim 1 and one or more base polymers selected from the group consisting of unmodified polyolefins and unmodified thermoplastic styrene block copolymers (TPE-S), wherein the silane-modified polypropylene copolymer and the one or more base polymers together form at least 50% by weight of the hotmelt adhesive formulation and the silane-modified polypropylene copolymer is not more than 30% by weight of the hotmelt adhesive formulation.

12. The hotmelt adhesive formulation according to claim 11, wherein the hotmelt adhesive formulation has a melt viscosity of less than 5000 mPas, as measured according to DIN 53019 at 170° C., and a tensile strength of at least 4 MPa, as measured according to DIN EN ISO 527-3.

13. The hotmelt adhesive formulation according to claim 11, wherein the hotmelt adhesive formulation further comprises less than 35% by weight tackifier, based on the total mass of the hotmelt adhesive formulation.

14. The hotmelt adhesive formulation according to claim 13, wherein the hotmelt adhesive formulation contains, based on the total mass of the hotmelt adhesive formulation, 40-80% by weight of base polymer, 10-30% by weight of silane-modified polypropylene copolymer, and 10-30% by weight of tackifier.

15. The silane-modified polypropylene copolymer according to claim 1, further comprising a crosslinking accelerator in an amount of 0.1%- 1% by weight, based on the total amount of the silane-modified polypropylene copolymer and the crosslinking accelerator.

16. The hotmelt adhesive formulation according to claim 11, further comprising a crosslinking accelerator in an amount of 0.1%- 1% by weight, based on the total amount of the hotmelt adhesive formulation.

17. The silane-modified polypropylene copolymer according to claim 1, wherein the silane-modified polypropylene copolymer is prepared from an unmodified polypropylene copolymer with an enthalpy of fusion of between 30 J/g and 50 J/g.

18. The silane-modified polypropylene copolymer according to claim 1, wherein the silane-modified polypropylene copolymer is prepared from an unmodified polypropylene copolymer with a melt viscosity of between 500 and 7000 mPas, as measured according to DIN 53019 at 170° C.

19. The silane-modified polypropylene copolymer according to claim 1, wherein the ethylene triad content of the silane-modified polypropylene copolymer is greater than 2.5% by weight, based on the content of the ethylene, as determined by $^{13}$C-NMR spectroscopy.

* * * * *